(12) United States Patent
Crowther

(10) Patent No.: US 11,092,249 B2
(45) Date of Patent: Aug. 17, 2021

(54) BINARY MODE FLUID VALVE

(71) Applicant: Hanon Systems, Daejeon (KR)

(72) Inventor: David Crowther, Bloomfield Hills, MI (US)

(73) Assignee: HANON SYSTEMS, Daejeon (KR)

( * ) Notice: Subject to any disclaimer, the term of this patent is extended or adjusted under 35 U.S.C. 154(b) by 136 days.

(21) Appl. No.: 16/711,580

(22) Filed: Dec. 12, 2019

(65) Prior Publication Data

US 2021/0180706 A1    Jun. 17, 2021

(51) Int. Cl.
*F16K 11/074*    (2006.01)
*F16K 3/04*    (2006.01)

(52) U.S. Cl.
CPC ............ *F16K 11/0746* (2013.01); *F16K 3/04* (2013.01)

(58) Field of Classification Search
CPC ...... F16K 11/0746; F16K 11/074; F16K 3/04; Y10T 137/87161; Y10T 137/86107; Y10T 137/86863; Y10T 137/87249
See application file for complete search history.

(56) References Cited

U.S. PATENT DOCUMENTS

| | | | | | |
|---|---|---|---|---|---|
| 2,678,062 A | * | 5/1954 | MacNeill | ................ | F16K 11/02 137/595 |
| 2,989,082 A | * | 6/1961 | Ray | ................... | F16K 11/0743 137/625.46 |
| 3,090,396 A | * | 5/1963 | Rudelick | ............. | F16K 11/0856 137/375 |
| 3,513,981 A | * | 5/1970 | Mendelow | ........... | B01D 29/668 210/411 |
| 3,911,956 A | * | 10/1975 | LeBreton | ............ | F16K 11/0743 137/625.46 |
| 4,355,659 A | * | 10/1982 | Kelchner | ............ | F16K 11/0856 137/597 |
| 4,655,252 A | * | 4/1987 | Krumhansl | ......... | F16K 11/0853 137/269 |

(Continued)

FOREIGN PATENT DOCUMENTS

| | | |
|---|---|---|
| JP | 2011043183 A | 3/2011 |
| JP | 2014211291 A | 11/2014 |

(Continued)

*Primary Examiner* — Reinaldo Sanchez-Medina
*Assistant Examiner* — Nicole Gardner
(74) *Attorney, Agent, or Firm* — Shumaker, Loop & Kendrick, LLP; James D. Miller

(57) ABSTRACT

A valve includes a main body defining four flow chambers, a first end cap coupled to a first end of the main body, and a second end cap coupled to a second end of the main body. A first rotatable disc is coupled to a rotatable shaft adjacent the first end of the main body and a second rotatable disc is coupled to the rotatable shaft adjacent the second end of the main body. The first rotatable disc includes first and second communication openings and the second rotatable disc includes a third and fourth communication openings. The first communication opening, the first end cap, and the second communication opening cooperate to provide fluid communication between a first pair of the flow chambers while the third communication opening, the second end cap, and the fourth communication opening cooperate to provide fluid communication between a second pair of the flow chambers.

20 Claims, 7 Drawing Sheets

(56) References Cited

U.S. PATENT DOCUMENTS

| | | | | |
|---|---|---|---|---|
| 4,774,977 A | * | 10/1988 | Cohen | F16K 11/0525 |
| | | | | 137/271 |
| 6,634,380 B2 | * | 10/2003 | Bartkus | F16K 11/0743 |
| | | | | 137/625.46 |
| 9,500,299 B2 | * | 11/2016 | Morein | F16K 41/026 |
| 2019/0368621 A1 | | 12/2019 | Marchand et al. | |

FOREIGN PATENT DOCUMENTS

| | | |
|---|---|---|
| JP | 2016089901 A | 5/2016 |
| KR | 20190110032 A | 9/2019 |

* cited by examiner

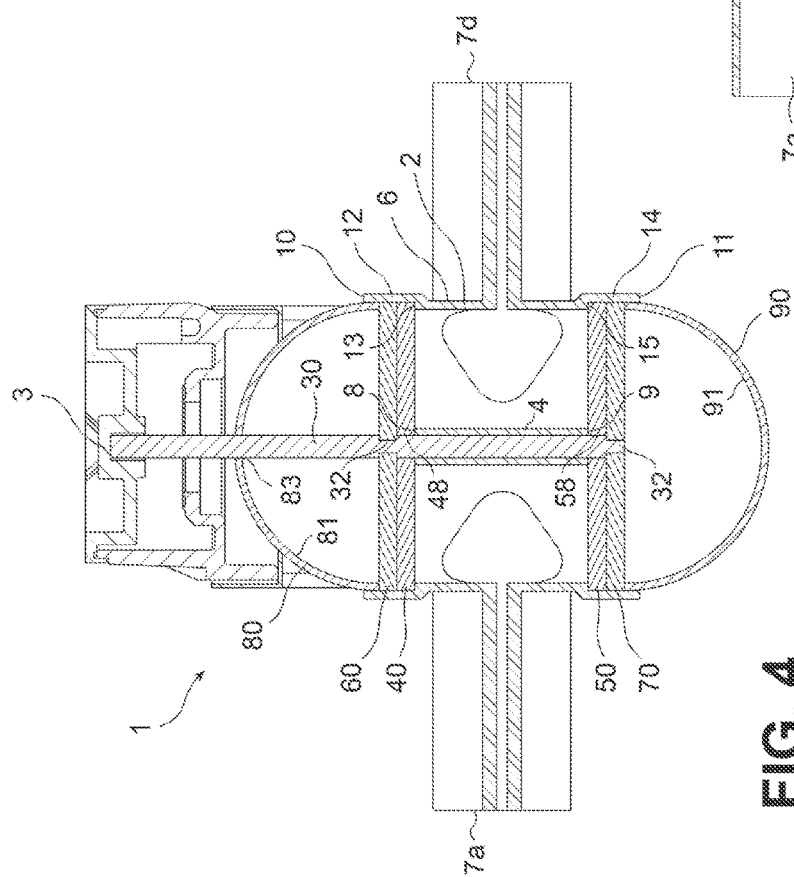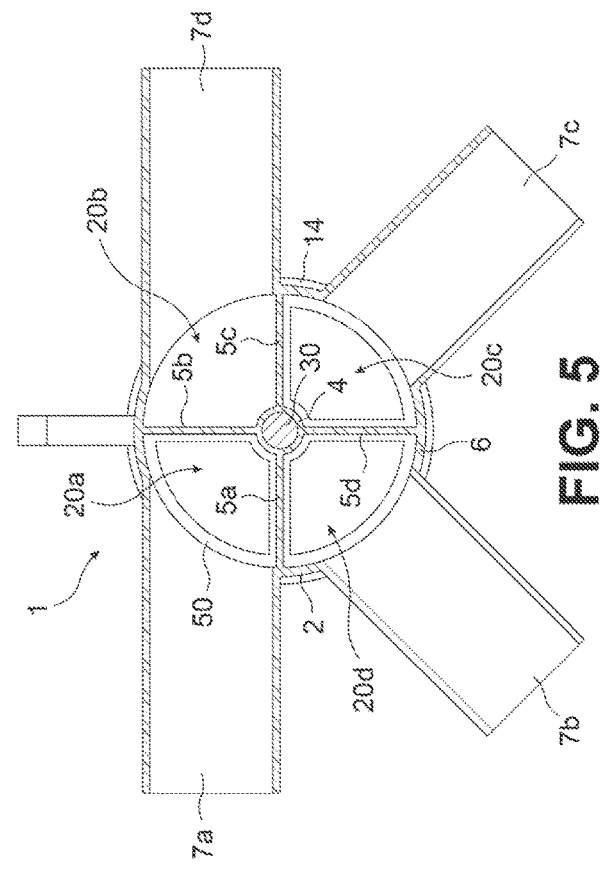
FIG. 4
FIG. 5

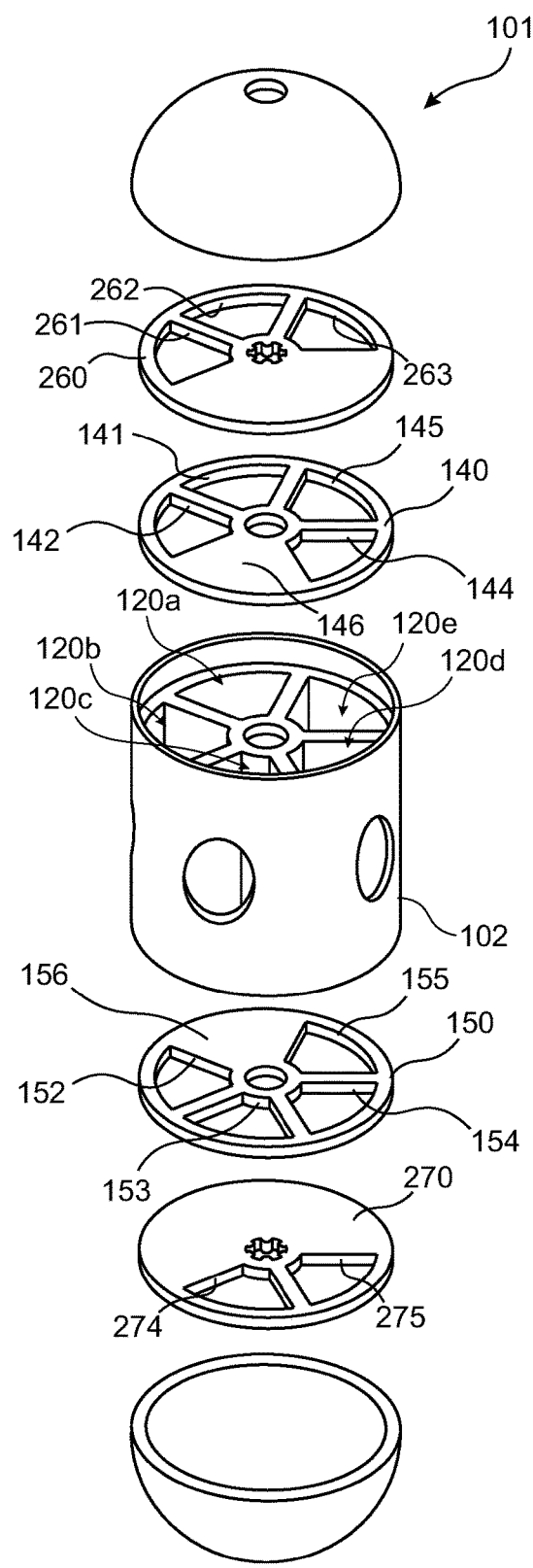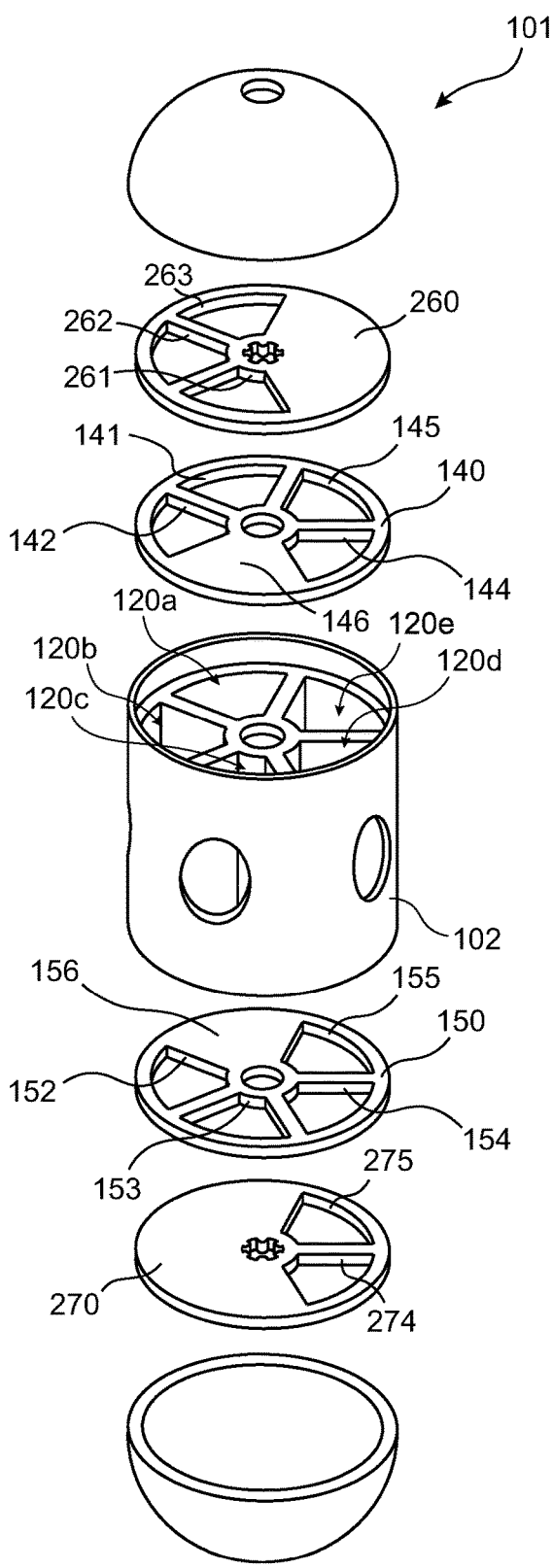
FIG. 10   FIG. 11

BINARY MODE FLUID VALVE

FIELD

The present invention relates to a fluid control valve, and more particularly to a four-way fluid control valve switchable between two distinct modes of operation, wherein each of the modes of operation corresponds to a different flow configuration through the four-way fluid control valve.

BACKGROUND OF THE INVENTION

It is known in the art to utilize a fluid control valve for selectively switching the flow configuration through one or more associated fluid circuits or systems. For example, FIGS. 1 and 2 illustrate the general configuration of a four-way ball or cylinder type control valve 101 configured to operate in either of two different operating modes. The control valve 101 generally includes a main body 102 defining four distinct fluid ports 105 and a rotatable core 106 configured to selectively rotate relative to the main body 102. The four fluid ports 105 includes a first pair of the fluid ports 105 in direct fluid communication with a first fluid line 111 and an oppositely arranged second pair of the fluid ports 105 in direct fluid communication with a second fluid line 112 provided independently of the first fluid line 111.

The rotatable core 106 includes a first flow path 107 and a second flow path 108 formed therethrough, wherein each of the flow paths 107, 108 is configured to fluidly couple two of the fluid ports 105 to each other depending on a positon of the rotatable core 106. The rotatable core 106 is adjustable to a first position (FIG. 1) wherein the first flow path 107 is in fluid communication with only the first fluid line 111 while the second flow path 108 is in fluid communication with only the second fluid line 112, hence the control valve 101 forms two independent fluid circuits when in the first position. In contrast, adjustment of the rotatable core 106 to a second position (FIG. 2) results in each of the flow paths 107, 108 being in fluid communication with each of the fluid lines 111, 112, thereby causing the control valve 101 to form one enlarged circuit when in the second position.

The manner in which the core 106 rotates relative to the stationary main body 102 leads to the need for a fluid tight seal therebetween to prevent leakage of the associated fluid controlled by the valve 101, and especially when the rotatable core 106 is being actuated between the disclosed first and second positions. Such a fluid tight seal requires the use of multiple sealing elements for sealing each of the openings formed in either of the main body 102 or the core 106, and such sealing elements must be engaged with a radially extending force present between the core 106 and the main body 102 to ensure the presence of the fluid tight seal therebetween. The need for this radial force at multiple fluid openings in turn limits the suitable sealing materials available for providing the seal between the main body 102 and the core 106. Specifically, the sealing material must be selected to provide smooth and lubricious rotation of the core 106 relative to the main body 102. Such sealing assemblies also typically include multiple components while using high cost sealing materials, which results in such control valves being relatively high in cost. The presence of the radial force necessary for forming the sealing engagement between the different components also leads to the need for an increased torque to be applied to the core 106 for adjusting the position thereof, which in turn limits the selection of the associated actuator used to adjust the rotational position of the core 106.

Accordingly, it would desirable to produce a reduced cost, four-way binary mode control valve utilizing fewer components while eliminating the need for the application of a radial sealing force between components configured to rotate relative to each other.

SUMMARY OF THE INVENTION

In accordance and attuned with the present invention, an improved four-way binary mode switching valve has surprisingly been discovered.

According to an embodiment of the disclosure, a flow control valve comprises a main body extending axially from a first end to a second end. The main body defines a shaft guide and four flow chambers spaced circumferentially around the shaft guide. A rotatable shaft is received in the shaft guide of the main body. A first end cap is coupled to the first end of the main body and a second end cap is coupled to the second end of the main body. A first rotatable disc is coupled to the rotatable shaft adjacent the first end of the main body and a second rotatable disc is coupled to the rotatable shaft adjacent the second end of the main body. The first rotatable disc includes a first communication opening and a second communication opening formed therein while the second rotatable disc includes a third communication opening and a fourth communication opening formed therein. The first communication opening, an interior of the first end cap, and the second communication opening cooperate to provide fluid communication between a first pair of the flow chambers, and the third communication opening, an interior of the second end cap, and the fourth communication opening cooperate to provide fluid communication between a second pair of the flow chambers distinct from the first pair. Rotation of the rotatable shaft alters which of the flow chambers constitutes the first pair of the flow chambers and which of the flow chambers constitutes the second pair of the flow chambers.

According to another embodiment of the disclosure, a flow control valve comprises a main body extending axially from a first end to a second end. The main body defines a shaft guide and four flow chambers spaced circumferentially around the shaft guide, the four flow chambers including a first flow chamber, a second flow chamber, a third flow chamber, and a fourth flow chamber provided in that order with respect to a circumferential direction around the shaft guide. A rotatable shaft is received in the shaft guide of the main body. A first end cap is coupled to the first end of the main body. A second end cap is coupled to the second end of the main body. A first rotatable disc is coupled to the rotatable shaft adjacent the first end of the main body and a second rotatable disc is coupled to the rotatable shaft adjacent the second end of the main body. The first rotatable disc includes a first communication opening and a second communication opening formed therein and the second rotatable disc includes a third communication opening and a fourth communication opening formed therein. A first mode of operation of the flow control valve includes the first communication opening, an interior of the first end cap, and the second communication opening cooperating to provide fluid communication between the first flow chamber and the fourth flow chamber and the third communication opening, an interior of the second end cap, and the fourth communication opening cooperating to provide fluid communication between the second flow chamber and the third flow chamber. A second mode of operation of the flow control valve includes the first communication opening, the interior of the first end cap, and the second communication opening cooperating to provide fluid communication between the third flow chamber and the fourth flow chamber and the third communication opening, the interior of the second end cap, and the fourth communication opening cooperating to provide fluid communication between the first flow chamber and the second flow chamber.

BRIEF DESCRIPTION OF THE DRAWINGS

The above advantages of the invention will become readily apparent to those skilled in the art from reading the following detailed description of an embodiment of the invention in the light of the accompanying drawings, in which:

FIG. 4 is a cross-sectional view of the four-way binary mode control valve as taken through section lines 4-4 in FIG. 3;

FIG. 5 is a cross-sectional view of the four-way binary control valve as taken through section lines 5-5 in FIG. 3;

FIG. 10 is an exploded perspective view of a control valve according to yet another embodiment of the present invention with the control valve operating in a first mode of operation; and FIG. 11 is an exploded perspective view of the control valve of FIG. 10 with the control valve operating in a second mode of operation.

DETAILED DESCRIPTION OF THE PREFERRED EMBODIMENT

Figure 1:
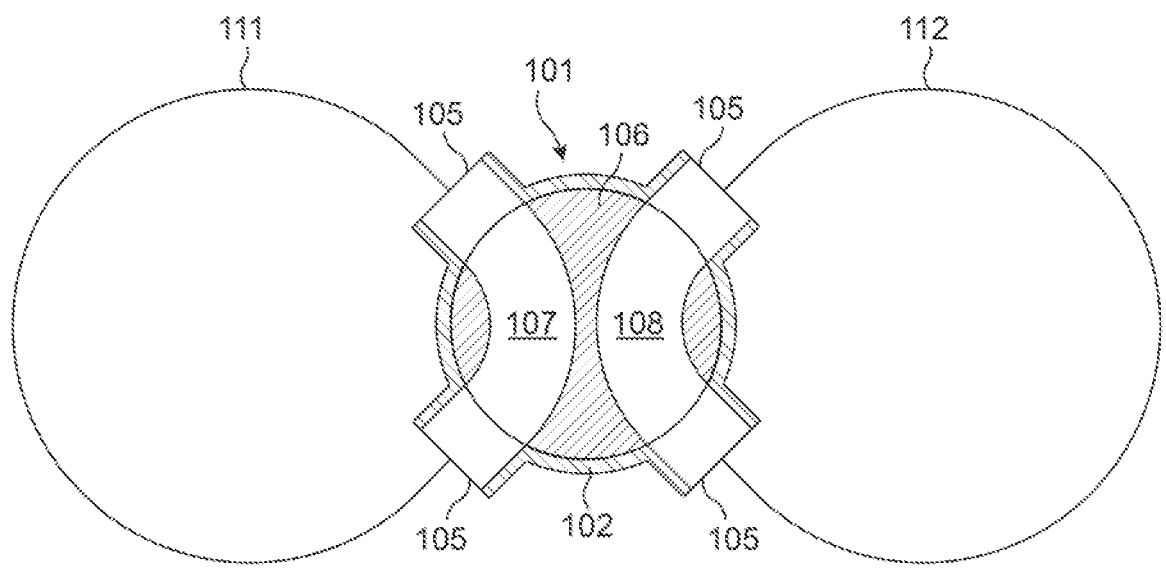
FIG. 1 is a schematic cross-sectional view of a four-way binary mode control valve according to the prior art when operating in a first mode of operation.

The following detailed description and appended drawings describe and illustrate various exemplary embodiments of the invention. The description and drawings serve to enable one skilled in the art to make and use the invention, and are not intended to limit the scope of the invention in any manner.

As used herein, references to direct fluid communication between two fluid conveying structures indicates that the fluid passes directly from a first fluid conveying structure into a second fluid conveying structure without passing through any intervening fluid conveying structures. For example, direct fluid communication may be provided when a fluid passes through or over a boundary formed between the two fluid conveying structures, such as when passing through an opening formed in one of the fluid conveying structures. In contrast, references to indirect fluid communication between two fluid conveying structures indicates that the fluid passes through at least a third intervening fluid conveying structure when passing from the first fluid conveying structure to the second fluid conveying structure. For example, the fluid may pass through a connecting pipe or conduit disposed between the first fluid conveying structure and the second fluid conveying structure, wherein the connecting pipe or conduit may be referred to as providing the indirect fluid communication between the first and second fluid conveying structures. Additionally, references to an intervening fluid conveying structure or a boundary between a first fluid conveying structure and a second fluid conveying structure providing fluid communication between the first and second fluid conveying structures indicates that the fluid is able to pass through the intervening fluid conveying structure or the boundary when passing between the first and second fluid conveying structures, as opposed to requiring an alternative flow path not including the intervening fluid conveying structure or the boundary between the first and second fluid conveying structures. Additionally, references to a third and intervening fluid conveying structure providing direct fluid communication between a first fluid conveying structure and a second fluid conveying structure indicates that the third and intervening fluid conveying structure is the only fluid conveying structure through which the fluid passes when traveling from the first fluid conveying structure to the second fluid conveying structure, hence additional intervening fluid conveying structures are not disposed between the third and intervening fluid conveying structure and either of the first fluid conveying structure or the second fluid conveying structure. References to more than one intervening fluid conveying structure cooperating to provide fluid communication between a first fluid conveying structure and a second fluid conveying structure indicates that each of the intervening fluid conveying structures is able to be passed by the fluid at some point when traveling from the first fluid conveying structure to the second fluid conveying structure. Lastly, references to a boundary or an intervening fluid conveying structure providing selective fluid communication between a first fluid conveying structure and a second fluid conveying structure indicates that the boundary or intervening fluid conveying structure is capable of providing fluid communication therebetween, but only when another condition is met such as the actuation of a component used to open or close the flow path between the first fluid conveying structure and the second fluid conveying structure.

FIGS. 3-7 illustrate a four-way binary mode flow control valve 1 configured for switching between two different modes of operation, hereinafter referred to as the valve 1 for brevity. The valve 1 may be associated with any type of fluid system in need of a switching of the flow configuration therethrough in the manner described herein, such as an air conditioning system, a coolant system, a supercharging system, or the like, as desired. The valve 1 may be used to control any type of fluid, but may be particularly well suited to applications for controlling liquids such as water, glycol, or mixtures thereof, as desired. The valve 1 generally includes a main body 2, a rotatable shaft 30 associated with a rotary actuator 3, a first fixed disc 40, a second fixed disc 50, a first rotatable disc 60, a second rotatable disc 70, a first end cap 80, and a second end cap 90.

The main body 2 includes a shaft guide 4, a plurality of dividing walls 5a, 5b, 5c, 5d, an outer circumferential wall 6, and a plurality of fluid ports 7a, 7b, 7c, 7d. The shaft guide 4 is cylindrical in shape and extends axially from a first end 8 to a second end 9 thereof. The outer circumferential wall 6 is similarly cylindrical in shape and extends axially from a first end 10 to a second end 11 thereof while surrounding and arranged concentric relative to the guide shaft 4. As can be seen in FIG. 4, the outer circumferential wall 6 includes a greater axial length than the shaft guide 4 with each end 10, 11 of the outer circumferential wall 6 extending axially beyond one of the corresponding ends 8, 9 of the shaft guide 4. A first flared portion 12 of the outer circumferential wall 6 extending axially beyond the first end 8 of the shaft guide 4 is flared radially outwardly to form a first annular shoulder 13 on an inner surface of the outer circumferential wall 6. Similarly, a second flared portion 14 of the outer circumferential wall 6 extending axially beyond the second end 9 of the shaft guide 4 is flared radially outwardly to form a second annular shoulder 15 on the inner surface of the outer circumferential wall 6. The first flared portion 12 and the second flared portion 14 each include an increased inner diameter in comparison to a central portion of the outer circumferential wall 6.

As best shown in FIG. 5, the plurality of dividing walls 5a, 5b, 5c, 5d includes a first dividing wall 5a, a second dividing wall 5b, a third dividing wall 5c, and a fourth dividing wall 5d. Each of the dividing walls 5a, 5b, 5c, 5d extends radially outwardly from an outer surface of the shaft guide 4 to an inner surface of the outer circumferential wall 6. The dividing walls 5a, 5b, 5c, 5d are spaced from each other circumferentially relative to the outer surface of the shaft guide 4 to divide the main body 2 into four distinct flow chambers 20a, 20b, 20c, 20d formed between the inner surface of the outer circumferential wall 6 and the outer surface of the shaft guide 4, wherein each of the flow chambers 20a, 20b, 20c, 20d is configured for conveying a flow of a fluid associated with operation of the valve 1 therethrough. The four flow chambers 20a, 20b, 20c, 20d include a first flow chamber 20a disposed between the first dividing wall 5a and the second dividing wall 5b, a second flow chamber 20b formed between the second dividing wall 5b and the third dividing wall 5c, a third flow chamber 20c formed between the third dividing wall 5c and the fourth dividing wall 5d, and a fourth flow chamber 20d formed between the fourth dividing wall 5d and the first dividing wall 5a. In the provided embodiment, each of the flow chambers 20a, 20b, 20c, 20d is disposed within a quadrant of the interior of the main body 2 with each of the dividing walls 5a, 5b, 5c, 5d angularly displaced from an adjacent one of the dividing walls 5a, 5b, 5c, 5d by an angle of 90 degrees. The configuration of the plurality of the dividing walls 5a, 5b, 5c, 5d relative to the shaft guide 4 and the outer circumferential wall 6 results in each of the flow chambers 20a, 20b, 20c, 20d having a cross-sectional shape resembling an annular sector, also referred to as a sector of an annulus.

The main body 2 further includes the plurality of the fluid ports 7a, 7b, 7c, 7d formed therein, wherein each of the fluid ports 7a, 7b, 7c, 7d is associated with only a single one of the fluid flow chambers 20a, 20b, 20c, 20d. Specifically, the plurality of fluid ports 7a, 7b, 7c, 7d includes a first fluid port 7a associated with the first flow chamber 20a, a second fluid port 7b associated with the second flow chamber 20b, a third fluid port 7c associated with the third flow chamber 20c, and a fourth fluid port 7d associated with the fourth flow chamber 20d. As used herein, the term "fluid port" generally refers to any type of opening formed in the outer circumferential wall 6 for providing fluid communication between one of the flow chambers 20a, 20b, 20c, 20d and a fluid conveying structure disposed exterior to the valve 1, wherein each of the openings may form an inlet into or an outlet out of one of the fluid flow chambers 20a, 20b, 20c, 20d depending on the direction of flow of the associated fluid. Each of the fluid ports 7a, 7b, 7c, 7d accordingly provides direct fluid communication between one of the flow chambers 20a, 20b, 20c, 20d and a portion of an externally provided fluid conveying structure such as a pipe, conduit, or the like, as desired.

In the provided embodiment, each of the fluid ports 7a, 7b, 7c, 7d is provided as a cylindrical conduit intersecting the outer circumferential wall 6 intermediate two adjacent ones of the dividing walls 5a, 5b, 5c, 5d such that each of the fluid ports 7a, 7b, 7c, 7d is associated with only one of the fluid flow chambers 20a, 20b, 20c, 20d. In some embodiments, each of the cylindrical conduits may be utilized for forming a coupling with an associated fluid line used for communicating the associated fluid to or from the valve 1. However, one skilled in the art should appreciate that any structure suitable for forming the inlet or outlet relative to one of the fluid flow chambers 20a, 20b, 20c, 20d may be utilized without necessarily departing from the scope of the present invention. For example, each of the fluid ports 7a, 7b, 7c, 7d may be formed as a cylindrical opening passing through the outer circumferential wall 6 that in turn receives a cylindrical end portion of an associated fluid line, as desired. Additionally, it should also be understood by one skilled in the art that one or more of the illustrated fluid ports 7a, 7b, 7c, 7d may alternatively be formed by a structure associated with an adjacent component of the associated fluid conveying system, such as a heat exchanger (not shown) or the like. In other words, the main body 2 of the valve 1 may be formed as a portion of a larger assembly including additional components of the fluid conveying system so long as the relationships described herein relating to the possible flow configurations through the valve 1 are maintained.

The first end cap 80 is coupled to the main body 2 at the first end 10 thereof while the second end cap 90 is coupled to the main body 2 at the second end 11 thereof. More specifically, a periphery of the first end cap 80 is received into the first flared portion 12 and is securely coupled thereto while a periphery of the second end cap 90 is received into the second flared portion 14 and is securely coupled thereto. The first end cap 80 includes a first turn-around surface 81 for redirecting the fluid passing through the first end cap 80 while the second end cap 90 includes a second turn-around surface 91 for redirecting the fluid passing through the second end cap 90. The first turn-around surface 81 and the second turn-around surface 91 are each formed as concave hemispherical surfaces facing towards the main body 2 at each respective end 10, 11 thereof. The hemispherical shape of each of the turn-around surfaces 81, 91 ensures that the fluid passing through each respective end cap 80, 90 experiences a minimal pressure drop when caused to change directions. Each of the turn-around surfaces 81, 91 is configured to redirect fluid entering one of the end caps 80, 90 from flowing in a first direction parallel to the axial direction of the main body 2 when entering the one of the end caps 80, 90 to a second direction also parallel to the axial direction of the main body 2 while arranged opposite the first direction. The fluid is accordingly directed to flow in a substantially arcuate path through each of the end caps 80, 90 when passing from one flow chamber 20a, 20b, 20c, 20d to another during operation of the valve 1.

As shown in FIG. 4, the first end cap 80 may include a central opening 83 configured to receive the rotatable shaft 30 therein. The central opening 83 of the first end cap 80 may include an inner diameter substantially equal to or slightly greater than the outer diameter of the rotatable shaft 30 to allow for rotation of the rotatable shaft 30 relative to the first end cap 80. A suitable sealing element (not shown) may be provided between an outer surface of the rotatable shaft 30 and an inner surface of the first end cap 80 defining the central opening 83 for preventing leakage of fluid into or out of the first end cap 80.

Figure 6:
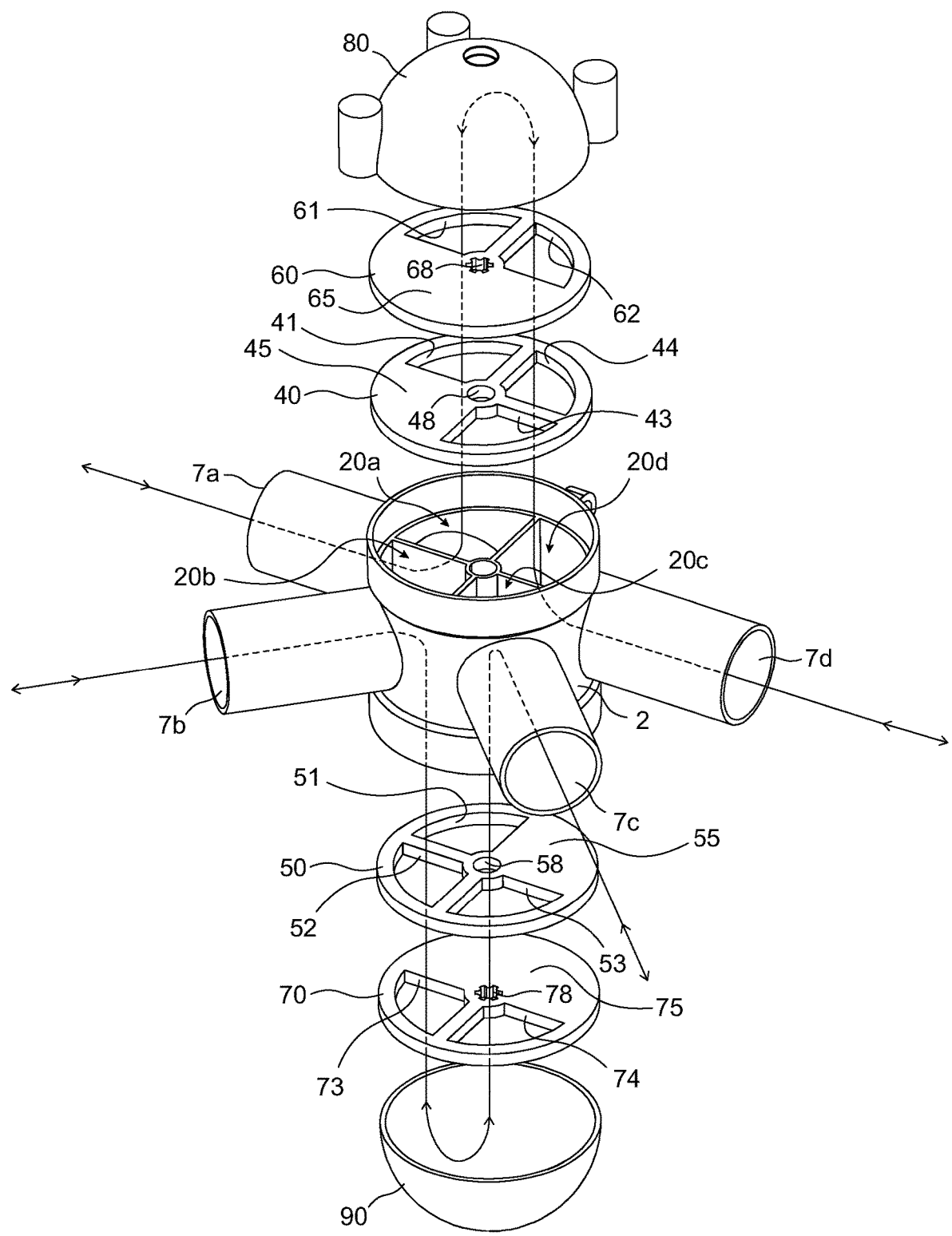
FIG. 6 is an exploded perspective view of the four-way binary control valve when operating in a first mode of operation, wherein a rotatable shaft of the four-way binary mode control valve is omitted for clarity.
Figure 7:
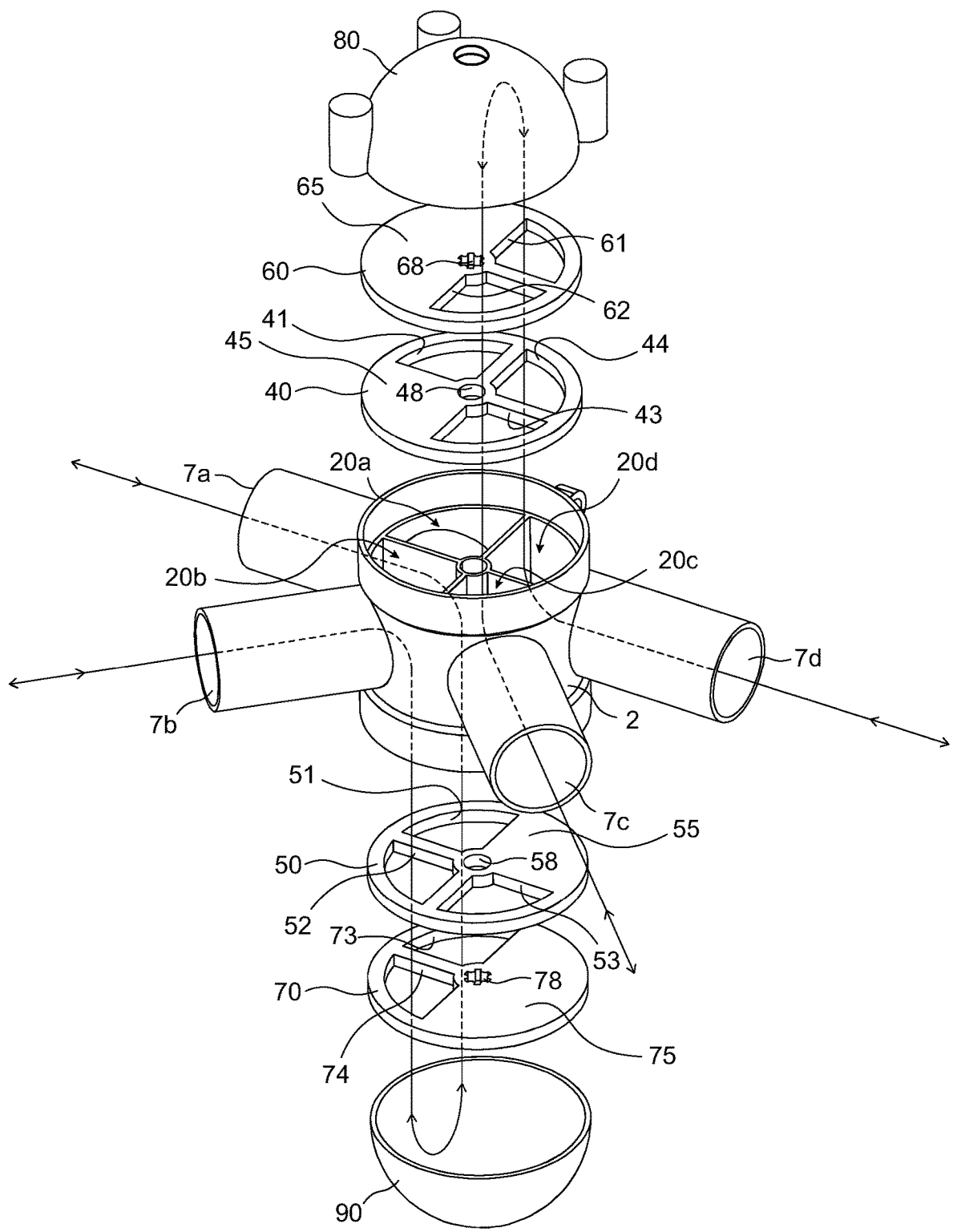
FIG. 7 is an exploded perspective view of the four-way binary mode control valve when operating in a second mode of operation, wherein the rotatable shaft is omitted for clarity.

The aforementioned fixed discs 40, 50 and rotatable discs 60, 70 are best shown structurally in FIGS. 6 and 7, which illustrate the valve 1 in exploded format and in the absence of the rotatable shaft 30 to more easily illustrate the possible flow configurations through the valve 1. The first fixed disc 40 and the first rotatable disc 60 each include a peripheral shape corresponding to a shape defined by the inner surface of the outer circumferential wall 6 at the first flared portion 12 thereof. Similarly, the second fixed disc 50 and the second rotatable disc 70 also includes a peripheral shape corresponding to a shape defined by the inner surface of the outer circumferential wall 6 at the second flared portion 14 thereof. In the illustrated embodiment, each of the discs 40, 50, 60, 70 is provided as a circular plate having opposing parallel arranged and planar surfaces separated from each other with respect to the axial direction of the main body 2.

As best shown in FIG. 4, the first fixed disc 40 is received within the first flared portion 12 while abutting the first annular shoulder 13 and the first end 8 of the shaft guide 4 and the second fixed disc 50 is received within the second flared portion 14 while abutting the second annular shoulder 15 and the second end 9 of the shaft guide 4. The first fixed disc 40 includes a first shaft opening 48 for receiving the rotatable shaft 30 of the rotary actuator 3 while the second fixed disc 50 similarly includes a second shaft opening 58 for receiving the rotatable shaft 30. The shaft openings 48, 58 are dimensioned to include an inner diameter substantially equal to or greater than the outer diameter of the rotatable shaft 30 to allow for rotation of the rotatable shaft 30 relative to the stationary first and second fixed discs 40, 50. The first fixed disc 40 and the second fixed disc 50 may be securely coupled to the main body 2 by any known coupling method, as desired. In some embodiments, a sealing element (not shown) may also be disposed between each fixed disc 40, 50 and each of the ends 10, 11 of the main body 2 for further ensuring that fluid cannot leak from one flow chamber 20 to another during use of the valve 1, as desired.

Referring again to FIGS. 6 and 7, the first fixed disc 40 includes a first chamber opening 41, a third chamber opening 43, and a fourth chamber opening 44. The first chamber opening 41 is formed in axial alignment with the first flow chamber 20a and selectively provides fluid communication between the first flow chamber 20a and an interior of the first end cap 80. The third chamber opening 43 is formed in axial alignment with the third flow chamber 20c and selectively provides fluid communication between the third flow chamber 20c and the interior of the first end cap 80. The fourth chamber opening 44 is formed in axial alignment with the fourth flow chamber 20d and selectively provides fluid communication between the fourth flow chamber 20d and the interior of the first end cap 80.

Each of the chamber openings 41, 43, 44 includes a cross-sectional shape substantially corresponding to the cross-sectional shape of the associated flow chamber 20a, 20c, 20d, which in the present case is the annular sector shape. However, one skilled in the art should appreciate that the chamber openings 41, 43, 44 may include alternative cross-sectional shapes without necessarily departing from the scope of the present invention. A portion of the first fixed disc 40 in axial alignment with the second flow chamber 20b is devoid of one of the flow chamber openings, and accordingly forms a fluid blockage portion 45 of the first fixed disc 40 that acts to block the flow of a fluid within the second flow chamber 20b from flowing directly into the interior of the first end cap 80. The first fixed disc 40 may be described as including four quadrants, wherein three of the quadrants include one of the chamber openings 41, 43, 44 for communicating fluid through the first fixed disc 40 while the fourth quadrant includes the fluid blockage feature 45 for preventing the communication of fluid through the first fixed disc 40.

The first fixed disc 40 accordingly prevents fluid communication between the second flow chamber 20b and the interior of the first end cap 80 through any type of flow path formed through the valve 1. However, as explained hereinafter, the second flow chamber 20b may be in indirect fluid communication with the interior of the first end cap 80 via a flow of the associated fluid outside of the valve 1 before again returning to an interior flow path defined by the valve 1, depending on a mode of operation of the valve 1.

The second fixed disc 50 includes a first chamber opening 51, a second chamber opening 52, and a third chamber opening 53. The first chamber opening 51 is formed in axial alignment with the first flow chamber 20a and selectively provides fluid communication between the first flow chamber 20a and an interior of the second end cap 90. The second chamber opening 52 is formed in axial alignment with the second flow chamber 20b and selectively provides fluid communication between the second flow chamber 20b and the interior of the second end cap 90. The third chamber opening 53 is formed in axial alignment with the third flow chamber 20c and selectively provides fluid communication between the third flow chamber 20c and the interior of the second end cap 90.

Each of the chamber openings 51, 52, 53 formed in the second fixed disc 50 includes a cross-sectional shape substantially corresponding to the cross-sectional shape of the associated flow chamber 20a, 20b, 20c, which in the present case is the annular sector shape. However, one skilled in the art should appreciate that the chamber openings 51, 52, 53 may include alternative cross-sectional shapes without necessarily departing from the scope of the present invention. A portion of the second fixed disc 50 in axial alignment with the fourth flow chamber 20d is devoid of one of the flow chamber openings, and accordingly forms a fluid blockage portion 55 of the second fixed disc 50 that acts to block the flow of a fluid within the fourth flow chamber 20d from flowing directly into the interior of the second end cap 90. The second fixed disc 50 may be described as including four quadrants, wherein three of the quadrants include one of the chamber openings 51, 53, 54 for communicating fluid through the second fixed disc 50 while the fourth quadrant includes the fluid blockage portion 55 for preventing the communication of fluid through the second fixed disc 50.

The second fixed disc 50 accordingly prevents fluid communication between the fourth flow chamber 20d and the interior of the second end cap 90 through any type of flow path formed through the valve 1. However, as explained hereinafter, the fourth flow chamber 20d may be in indirect fluid communication with the interior of the second end cap 90 via a flow of the associated fluid outside of the valve 1 before again returning to an interior flow path defined by the valve 1, depending on a mode of operation of the valve 1.

The first rotatable disc 60 is received within the first flared portion 12 of the outer circumferential wall 6 at an axial position between the first fixed disc 40 and the first end cap 80 while the second rotatable disc 70 is received within the second flared portion 14 of the outer circumferential wall 6 at an axial position between the second fixed disc 50 and the second end cap 90. The first rotatable disc 60 includes a first shaft opening 68 while the second rotatable disc 70 includes a second shaft opening 78, wherein each of the shaft openings 68, 78 is defined by a splined inner surface of the respective rotatable disc 60, 70. The splined inner surfaces are configured to engage corresponding splined portions 32 formed on the outer surface of the rotatable shaft 30. The splined connections allow for a transfer of rotational motion from the rotatable shaft 30 to each of the rotatable discs 60, 70 during operation of the valve 1. However, one skilled in the art should appreciate that the rotatable discs 60, 70 may be coupled to the rotatable shaft 30 using alternative structures or coupling methods without departing from the scope of the present invention, so long as the rotatable discs 60, 70 are able to simultaneously rotate in unison in reaction to rotation of the rotatable shaft 30 via actuation from the actuator 3. The actuator 3 may be any type of actuator capable of causing selective rotation of the rotatable shaft 30 and hence the rotatable discs 60, 70, such as a suitable electric rotary actuator. The electric rotary actuator may be a stepper motor or a servo motor, as non-limiting examples. However, one skilled in the art should appreciate that alternative actuators may be used without departing from the scope of the present invention, as desired.

The first rotatable disc 60 includes a first communication opening 61 and a second communication opening 62 formed therethrough. Each of the communication openings 61, 62 may be provided to include a cross-sectional shape corresponding to that of each of the flow chamber openings 41, 43, 44 of the first fixed disc 40, which in the present case is an annular sector shape. Additionally, each of the communication openings 61, 62 is positioned and oriented relative to the axis of rotation of the rotatable shaft 30 in a manner wherein each of the communication openings 61, 62 is capable of being placed in substantial axial alignment with each of the flow chamber openings 41, 43, 44 depending on the rotational position of the first rotatable disc 60. The substantial axial alignment may include an entirety of a perimeter of each of the communication openings 61, 62 in alignment with an entirety of one of the flow chamber openings 41, 43, 44 with respect to the axial direction of the valve 1. The communication openings 61, 62 are provided adjacent each other in a manner wherein the communication openings 61, 62 occupy two adjacent quadrants of the first rotatable disc 60 formed on one semi-circular half of the first rotatable disc 60. The opposing semi-circular portion of the first rotatable disc 60 occupying the remaining two quadrants is devoid of one of the communication openings 61, 62 and accordingly forms a fluid blockage portion 65 of the first rotatable disc 60 that acts to block the flow of the fluid therethrough. Accordingly, the first rotatable disc 60 may be used to provide selective fluid communication between two adjacent ones of the flow chambers 20*a*, 20*b*, 20*c*, 20*d* while concurrently preventing fluid communication between the other two remaining flow chambers 20*a*, 20*b*, 20*c*, 20*d* and the interior of the first end cap 80.

The second rotatable disc 70 includes a third communication opening 73 and a fourth communication opening 74 formed therethrough. Each of the communication openings 73, 74 may be provided to include a cross-sectional shape corresponding to that of each of the flow chamber openings 51, 52, 53 of the second fixed disc 50, which in the present case is an annular sector shape. Additionally, each of the communication openings 73, 74 is positioned and oriented relative to the axis of rotation of the rotatable shaft 30 in a manner wherein each of the communication openings 73, 74 is capable of being placed in substantial axial alignment with each of the flow chamber openings 51, 52, 53 depending on the rotational position of the second rotatable disc 70. The substantial axial alignment may include an entirety of a perimeter of each of the communication openings 73, 74 in axial alignment with an entirety of one of the flow chamber openings 51, 52, 53. The communication openings 73, 74 are provided adjacent each other in a manner wherein the communication openings 73, 74 occupy two adjacent quadrants of the second rotatable disc 70 formed on one semi-circular half of the second rotatable disc 70. The opposing semi-circular portion of the second rotatable disc 70 occupying the remaining two quadrants is devoid of one of the communication openings 73, 74 and accordingly forms a fluid blockage portion 75 of the second rotatable disc 70 that acts to block the flow of the fluid therethrough. Accordingly, the second rotatable disc 70 may be used to provide fluid communication between two adjacent ones of the flow chambers 20*a*, 20*b*, 20*c*, 20*d* while concurrently preventing fluid communication between the other two remaining flow chambers 20*a*, 20*b*, 20*c*, 20*d* and the interior of the first end cap 80.

As shown in each of FIGS. 6 and 7, the communication openings 61, 62 of the first rotatable disc 60 are never in axial alignment with the communication openings 73, 74 of the second rotatable disc 70. Instead, the two quadrants of the first rotatable disc 60 including the communication openings 61, 62 are in axial alignment with the two quadrants of the second rotatable disc 70 occupied by the fluid blockage portion 75 thereof. Similarly, the two quadrants of the second rotatable disc 70 including the communication openings 73, 74 are in axial alignment with the two quadrants of the first rotatable disc 60 forming the fluid blockage portion 65 thereof. The manner in which the communication openings 61, 62 of the first rotatable disc 60 are diametrically opposed to the communication openings 73, 74 of the second rotatable disc 70 with respect to the axis of rotation of the rotatable shaft 30 ensures that none of the flow chambers 20*a*, 20*b*, 20*c*, 20*d* are ever in fluid communication with more than one of the other flow chambers 20*a*, 20*b*, 20*c*, 20*d* via a flow path formed through the valve 1. This results in the flow chamber 20*a*, 20*b*, 20*c*, 20*d* placed in axial alignment with the first communication opening 61 of the first rotatable disc 60 only being able to fluidly communicate with the adjacent flow chamber 20*a*, 20*b*, 20*c*, 20*d* placed in axial alignment with the second communication opening 62 of the first rotatable disc 60 via a flow path formed through the valve. Similarly, the flow chamber 20*a*, 20*b*, 20*c*, 20*d* placed in axial alignment with the third communication opening 73 of the second rotatable disc 70 is only able to fluidly communicate with the adjacent flow chamber 20*a*, 20*b*, 20*c*, 20*d* placed in axial alignment with the fourth communication opening 74 of the second rotatable disc 70.

The outwardly facing planar surface of the first fixed disc 40 and the inwardly facing planar surface of the first rotatable disc 60 are placed in contact with each other while the outwardly facing planar surface of the second fixed disc 50 and the inwardly facing planar surface of the second rotatable disc 70 are similarly placed in contact with each other. Each of the engaging planar surfaces may be precision ground to provide for a smooth and flat surface providing minimized friction during rotation of each of the rotatable discs 60, 70 relative to the corresponding one of the fixed discs 40, 50. Each of the disclosed discs 40, 50, 60, 70 may accordingly be formed from a ceramic material having the requisite wear resistance to allow for repeated cycles of rotation of the rotatable discs 60, 70 relative to the fixed discs 40, 50 during a switching of the valve 1 between the two disclosed modes of operation thereof. The close contact between the engaging planar surfaces is provided to prevent flow between each rotatable disc and fixed disc pairing, thereby preventing the flow of the fluid to an undesired one of the flow chambers 20a, 20b, 20c, 20d during operation of the valve 1.

Although not illustrated, in some embodiments a spring element may be provided for each fixed disc and rotatable disc pair to ensure that continuous and fluid tight contact is made therebetween to further prevent leakage between the different flow chambers 20a, 20b, 20c, 20d. For example, a helical spring may be wound around the rotatable shaft 30 with one end thereof abutting the first turn-around surface 81 of the first end cap 80 and the other end abutting the first rotatable disc 60 with the helical spring configured to normally urge the first rotatable disc 60 towards the first fixed disc 40. The rotatable shaft 30 may also be extended axially to the second turn-around surface 82 of the second end cap 90 to allow for another helical spring to similarly be used to urge the second rotatable disc 70 towards the first fixed disc 50. However, any structure for urging each of the rotatable discs 60, 70 towards the corresponding one of the fixed discs 40, 50 may be utilized without departing from the scope of the present invention, as desired.

FIG. 6 illustrates the valve 1 when operating in a first mode of operation. The first mode of operation includes the first communication opening 61 of the first rotatable disc 60 in axial alignment with the first flow chamber 20a and the first chamber opening 41 of the first fixed disc 40 while the second communication opening 62 of the first rotatable disc 60 is in axial alignment with the fourth flow chamber 20d and the fourth chamber opening 44 of the first fixed disc 40. The first mode of operation also includes the third communication opening 73 of the second rotatable disc 70 in axial alignment with the second flow chamber 20a and the second chamber opening 52 of the second fixed disc 50 while the fourth communication opening 74 of the second rotatable disc 70 is in axial alignment with the third flow chamber 20c and the third chamber opening 53 of the second fixed disc 50.

When operating in the first mode of operation, the first chamber opening 41 of the first fixed disc 40, the first communication opening 61 of the first rotatable disc 60, the interior of the first end cap 80, the second communication opening 62 of the first rotatable disc 60, and the fourth chamber opening 44 of the first fixed disc 40 all cooperate to provide fluid communication between the first flow chamber 20a and the fourth flow chamber 20d within the valve 1. Additionally, the first mode of operation includes the second chamber opening 52 of the second fixed disc 50, the third communication opening 73 of the second rotatable disc 70, the interior of the second end cap 90, the fourth communication opening 74 of the second rotatable disc 70, and the third chamber opening 53 of the second fixed disc 50 all cooperating to provide fluid communication between the second flow chamber 20b and the third flow chamber 20c within the valve 1.

FIG. 7 illustrates the valve 1 when operating in a second mode of operation. The adjustment of the valve 1 from the first mode of operation to the second mode of operation includes a 90 degree rotation of the rotatable shaft 30 via the actuator 3, and hence a 90 degree rotation of each of the rotatable discs 60, 70. The second mode of operation includes the first communication opening 61 of the first rotatable disc 60 in axial alignment with the fourth flow chamber 20d and the fourth chamber opening 44 of the first fixed disc 40 while the second communication opening 62 of the first rotatable disc 60 is in axial alignment with the third flow chamber 20c and the third chamber opening 43 of the first fixed disc 40. The second mode of operation also includes the third communication opening 73 of the second rotatable disc 70 in axial alignment with the first flow chamber 20a and the first chamber opening 51 of the second fixed disc 50 while the fourth communication opening 74 of the second rotatable disc 70 is in axial alignment with the second flow chamber 20b and the second chamber opening 52 of the second fixed disc 50.

When operating in the second mode of operation, the fourth chamber opening 44 of the first fixed disc 40, the first communication opening 61 of the first rotatable disc 60, the interior of the first end cap 80, the second communication opening 62 of the first rotatable disc 60, and the third chamber opening 43 of the first fixed disc 40 all cooperate to provide fluid communication between the third flow chamber 20c and the fourth flow chamber 20d within the valve 1. Additionally, the second mode of operation includes the first chamber opening 51 of the second fixed disc 50, the third communication opening 73 of the second rotatable disc 70, the interior of the second end cap 90, the fourth communication opening 74 of the second rotatable disc 70, and the second chamber opening 52 of the second fixed disc 50 all cooperating with each other to provide fluid communication between the first flow chamber 20a and the second flow chamber 20b within the valve 1.

Figure 2:
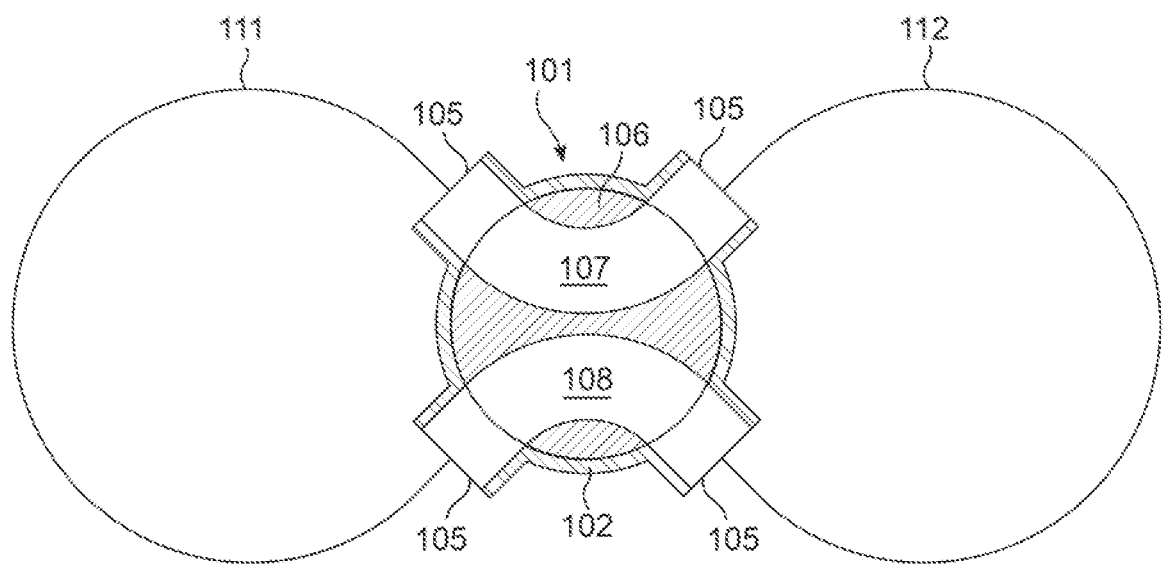
FIG. 2 is a schematic cross-sectional view of the four-way binary mode control valve of FIG. 1 when operating in a second mode of operation.
Figure 3:
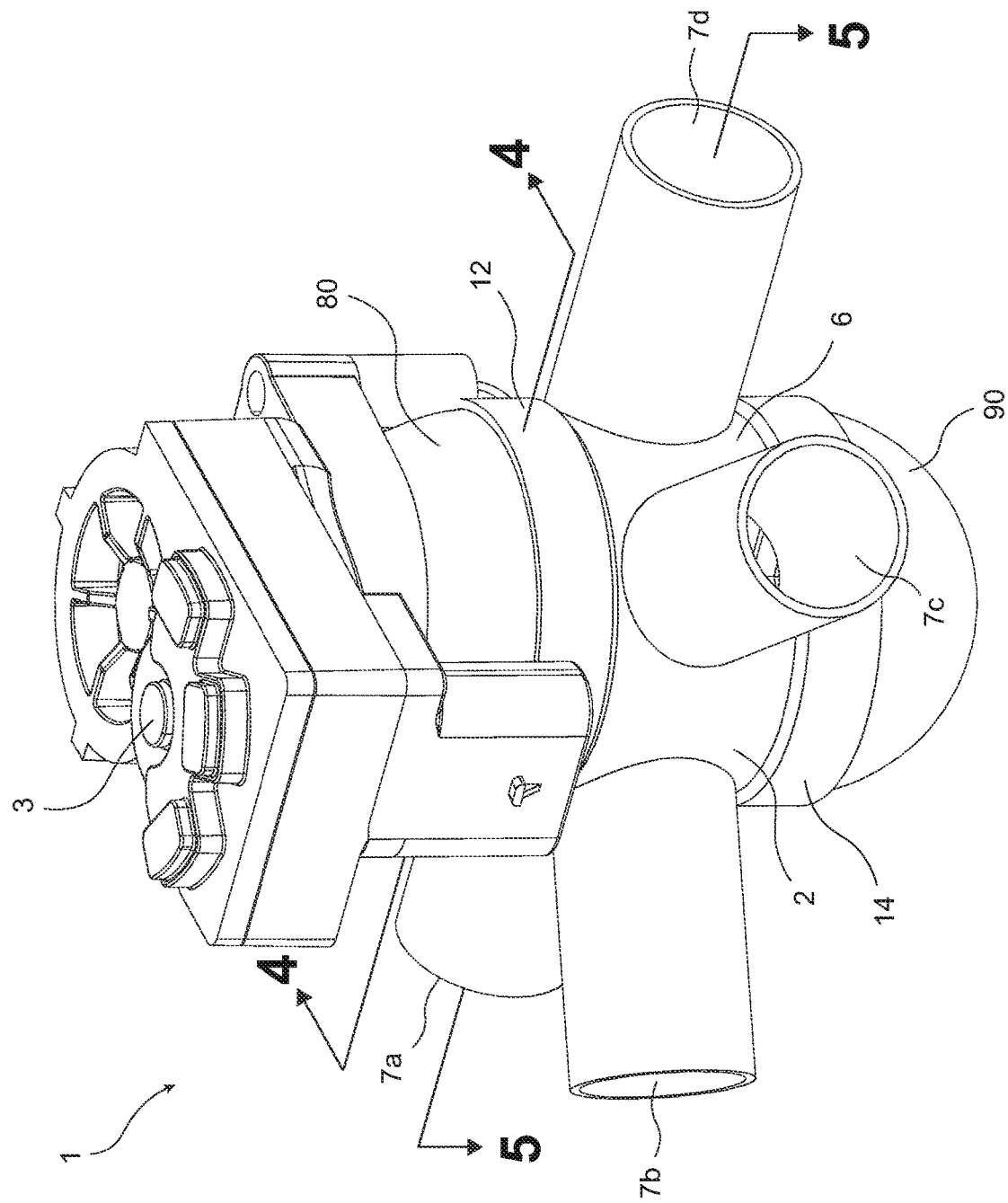
FIG. 3 is perspective view of a four-way binary mode control valve according to an embodiment of the present invention.

As indicated by the flow lines in FIGS. 6 and 7 (shown in broken line format when passing through or behind a structure forming the valve 1), the fluid may enter or exit the valve 1 via any of the various different fluid ports 7a, 7b, 7c, 7d while flowing in any available flow direction with respect to each of the first mode of operation and the second mode of operation. The fluid ports 7a, 7b, 7c, 7d of the valve 1 may be coupled to externally provided fluid lines (not shown) for communicating the associated fluid between the various different fluid ports 7a, 7b, 7c, 7d for achieving any of the disclosed flow configurations through the valve 1. For example, the switching of the valve 1 between the first and second modes of operation may correspond to the valve 1 switching the flow configuration of the fluid from two independent fluid loops each passing through the valve 1 to one combined fluid loop passing through the valve 1 in similar fashion to the configurations shown in FIGS. 1 and 2 with respect to the ball or cylinder type control valves of the prior art. One skilled in the art should further appreciate that the valve 1 may be used for any suitable application requiring the use of a four-way switching valve in addition to the two basic flow configurations shown herein, so long as the valve 1 maintains the relationship wherein each of the flow chambers 20a, 20b, 20c, 20d communicates with only one other adjacent one of the flow chambers 20a, 20b, 20c, 20d via a flow path formed through the valve 1 as disclosed herein.

The disclosed valve 1 accordingly is able to replace the ball or cylinder type control valve of the prior art while still achieving the same flow configurations therethrough. The valve 1 further provides the advantage of removing the need for a plurality of elastomeric seals for sealing each opening into or out of the corresponding control valve, thereby reducing the number of components needed to form the valve 1. The use of the ceramic discs 40, 50, 60, 70 for achieving the different modes of operation also reduces the amount of friction experienced by the valve 1 when switching from one mode of operation to the other, which in turn reduces the amount of torque needed to actuate the valve 1. The use of the precision ground ceramic engaging surfaces also creates a wear resistant sealing surface, which in turn improves the longevity of use of the valve 1 in comparison to the use of elastomeric sealing materials.

The advantageous features of the valve 1 may be applied to alternative configurations while remaining within the scope of the present invention. For example, FIGS. 8-11 illustrate a valve 101 having a main body 102 with five of the flow chambers 120a, 120b, 120c, 120d, 120e formed therein rather than the four as disclosed in the embodiment of FIGS. 3-7. As explained by way of example hereinafter, the ability for the valve 101 to communicate with additional flow paths via the inclusion of additional flow chambers within the valve 101 allows for a great variety of flow configurations to be realized by the valve 101 in comparison to the two flow configurations disclosed with reference to the valve 1.

The valve 101 is disclosed in FIGS. 8-11 as including a first fixed disc 140 having a first chamber opening 141 in axial alignment with the first flow chamber 120a, a second chamber opening 142 in axial alignment with the second flow chamber 120b, a fluid blockage portion 146 in axial alignment with the third flow chamber 120c, a fourth chamber opening 144 in axial alignment with the fourth flow chamber 120c, and a fifth chamber opening 145 in axial alignment with the fifth flow chamber 120e. The valve 101 further includes a second fixed disc 150 having a fluid blockage portion 156 in axial alignment with the first flow chamber 120a, a second chamber opening 152 in axial alignment with the second flow chamber 120b, a third chamber opening 153 in axial alignment with the third flow chamber 120c, a fourth chamber opening 154 in axial alignment with the fourth flow chamber 120d, and a fifth chamber opening 155 in axial alignment with the fifth flow chamber 120e.

Figure 8:
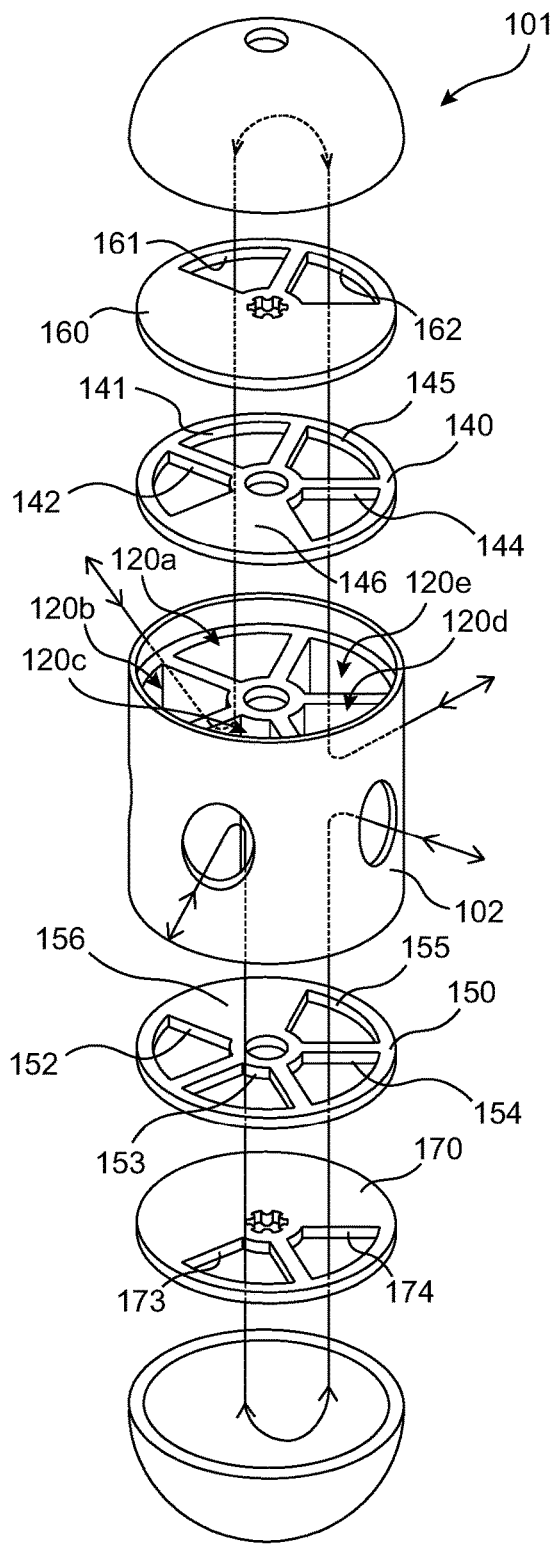
FIG. 8 is an exploded perspective view of a control valve according to another embodiment of the present invention with the control valve operating in a first mode of operation.
Figure 9:
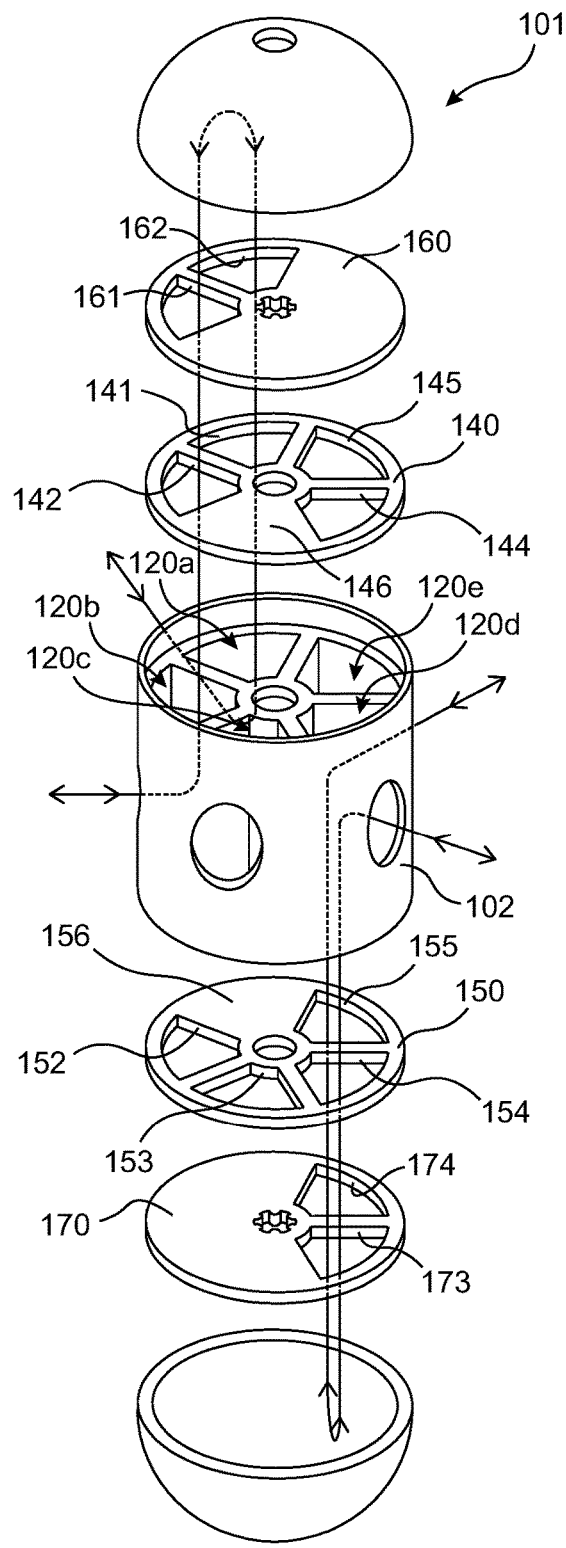
FIG. 9 is an exploded perspective view of the control valve of FIG. 8 with the control valve operating in a second mode of operation.

The embodiment disclosed in FIGS. 8 and 9 includes a first rotatable disc 160 adjacent the first fixed disc 140 and a second rotatable disc 170 adjacent the second fixed disc 150. The first rotatable disc 160 includes a first communication opening 161 and a second communication opening 162 formed therethrough. In the provided embodiment, the first communication opening 161 is disposed immediately adjacent the second communication opening 162 with respect to a circumferential direction of the first rotatable disc 160. The second rotatable disc 170 includes a third communication opening 173 and a fourth communication opening 174 formed therethrough, with the third communication opening 173 disposed immediately adjacent the fourth communication opening 174 with respect to the circumferential direction of the second rotatable disc 170.

The remainder of the valve 101, and especially those portions of the valve 101 omitted by the exploded views of FIGS. 8-11 for illustrative purposes, operates in the same general fashion as the valve 1 and description thereof is accordingly not included herein.

FIG. 8 illustrates the valve 101 when operating in a first mode of operation. The first mode of operation includes the first communication opening 161 of the first rotatable disc 160 disposed in axial alignment with the first flow chamber 120a and the second communication opening 162 of the first rotatable disc 160 disposed in axial alignment with the fifth flow chamber 120e. The first mode of operation further includes the third communication opening 173 of the second rotatable disc 170 disposed in axial alignment with the third flow chamber 120c and the fourth communication opening 174 of the second rotatable disc 170 disposed in axial alignment with the fourth flow chamber 120d. The first mode of operation accordingly includes fluid communication between the port associated with the first flow chamber 120a and the port associated with the fifth flow chamber 120e as well as fluid communication between the port associated with the third flow chamber 120c and the port associated with the fourth flow chamber 120d. The second flow chamber 120b is not placed in direct fluid communication with any other of the other flow chambers of the valve 101 when operating in the first mode of operation.

FIG. 9 illustrates the valve 101 when operating in a second mode of operation. As can be seen by comparison of FIG. 8 to FIG. 9, the actuation of the valve 1 from the first mode of operation to the second mode of operation includes a rotation of the first and second rotatable discs 160, 170 that is counter-clockwise with respect to the perspective of FIGS. 8 and 9. The second mode of operation includes the first communication opening 161 of the first rotatable disc 160 disposed in axial alignment with the second flow chamber 120b and the second communication opening 162 of the first rotatable disc 160 disposed in axial alignment with the first flow chamber 120a. The second mode of operation further includes the third communication opening 173 of the second rotatable disc 170 disposed in axial alignment with the fourth flow chamber 120d and the fourth communication opening 174 of the second rotatable disc 170 disposed in axial alignment with the fifth flow chamber 120e. The second mode of operation accordingly includes fluid communication between the port associated with the first flow chamber 120a and the port associated with the second flow chamber 120b as well as fluid communication between the port associated with the fourth flow chamber 120d and the port associated with the fifth flow chamber 120e. The third flow chamber 120c is not placed in direct fluid communication with any other of the other flow chambers of the valve 101 when operating in the second mode of operation.

The first and second rotatable discs 160, 170 may alternatively be rotated in the clockwise direction from the perspective of FIG. 8 to a position corresponding to a third mode of operation (not shown) having a different flow configuration therethrough. The switching of the valve 101 from the first mode of operation to the third mode of operation also includes a switching of the flow chamber not placed in direct fluid communication with the remaining flow chambers being switched from the second flow chamber 120b to the first flow chamber 120a.

The addition of the fifth flow chamber 120e accordingly allows for the switching of two independent flow paths through the valve 101 in similar fashion to the valve 1 while also introducing an additional feature of selectively blocking one of the ports associated with the valve 101 from fluid communication with the remaining ports of the valve 101. The valve 101 accordingly has the capability for additional flow configurations in addition to the two disclosed with regards to the valve 1.

It should also be understood by one skilled in the art that additional flow chambers may be added to the disclosed valve configuration without necessarily departing from the scope of the present invention. Specifically, the valve body may be modified to include six, seven, eight, and so on of the flow chambers for connecting a corresponding number of fluid ports representing the same number of positions on a corresponding fluid circuit. The fluid communication openings formed in the first and second rotatable discs may be positioned in any desired non-overlapping position for forming any desired flow configuration between the different flow chambers.

FIGS. 10 and 11 further expand on the concept of FIGS. 8 and 9 by further introducing a three way flow with respect to one fluid flow path through the valve 101. In contrast to the embodiment of FIGS. 8 and 9, the embodiment of FIGS. 10 and 11 includes the first rotatable disc 260 having each of a first communication opening 261, a second communication opening 262, and a third communication opening 263 and the second rotatable disc 270 having each of a fourth communication opening 274 and a fifth communication opening 275. The communication openings 261, 262, 263 of the first rotatable disc 260 are provided consecutively with respect to the circumferential direction of the first rotatable disc 260 while the communication openings 274, 275 of the second rotatable disc 270 are provided in the two remaining circumferential positions of the second rotatable disc 270 not in axial alignment in the communication openings 261, 262, 263 of the first rotatable disc 260.

The valve 101 is shown when operating in a first mode of operation in FIG. 10 and when operating in a second mode of operation in FIG. 11. The first mode of operation includes the first communication opening 261 in axial alignment with the second flow chamber 120*b*, the second communication opening 262 in axial alignment with the first flow chamber 120*a*, and the third communication opening 263 in axial alignment with the fifth flow chamber 120*e*. The first mode of operation further includes the fourth communication opening 274 in axial alignment with the third flow chamber 120*c* and the fifth communication opening 275 in axial alignment with the fourth flow chamber 120*d*. The use of three communication openings 261, 262, 263 in the first rotatable disc 260 accordingly allows for a flow configuration therethrough wherein flow is either combined in one of the flow chambers 120*a*, 120*b*, 120*e* from two of the other flow chambers 120*a*, 120*b*, 120*e* or divided after exiting one of the flow chambers 120*a*, 120*b*, 120*e* for flow into two of the other flow chambers 120*a*, 120*b*, 120*e*, depending on the pressure of the associated fluid with respect to each of the flow chambers 120*a*, 120*b*, 120*e*. Concurrently, the remaining two communication openings 274, 275 of the second rotatable disc 270 maintain the one-to-one flow configuration as previously disclosed with respect to the embodiment of the valve 101 disclosed in FIGS. 8 and 9.

The second mode of operation includes the rotatable discs 260, 270 rotated in unison one circumferential position in the counter-clockwise direction from the position shown with respect to the first mode of operation. The second mode of operation includes the first communication opening 261 of the first rotatable disc 260 rotated to a position in alignment with the fluid blockage portion 146 of the first fixed disc 140, thereby blocking flow therethrough. The second mode of operation accordingly includes each of the remaining four communication openings 262, 263, 274, 275 in fluid communication with only one of the other four remaining communication openings 262, 263, 274, 275 in similar fashion to each of the operating modes of the embodiment of FIGS. 8 and 9.

It should be apparent to one skilled in the art from the above examples that the modifications to the valve 1 as disclosed in FIGS. 8-11 may be expanded to valve configurations including any number of flow chambers and corresponding fluid ports while remaining within the scope of the present invention. For example, the 2-2 flow configurations disclosed in FIGS. 8 and 9 with respect to a five chambered structure may be replicated in a structure having six chambers, seven chambers, eight chambers, and so on, so long as the fixed and rotatable discs are modified to include openings corresponding to the addition divisions of the structure forming the flow chambers. Furthermore, the rotatable and fixed discs may also be modified to include any desired number of the communication openings or fluid blockage portions for prescribing any number of different flow configurations through the corresponding valve, as desired. For example, one or both of the rotatable discs may include more than two communication openings for communicating fluid between multiple different flow chambers in a manner including a division or a combining of fluid flows within the valve in any variety of different flow configurations, such as a 1-2 flow configuration, a 2-1 flow configuration, a 1-3 flow configuration, a 3-1 flow configuration, a 2-3 flow configuration, a 3-2 flow configuration, and so forth and so on. As illustrated in the example of FIGS. 10 and 11, the discs may further be provided with selectively positioned fluid blockage portions for preventing communication between specific flow chambers and for varying the flow configuration through the valve 101 upon rotation of the discs.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A flow control valve comprising:
a main body extending axially from a first end to a second end, the main body defining a shaft guide and four flow chambers spaced circumferentially around the shaft guide;
a rotatable shaft received in the shaft guide of the main body;
a first end cap coupled to the first end of the main body;
a second end cap coupled to the second end of the main body;
a first rotatable disc coupled to the rotatable shaft adjacent the first end of the main body, the first rotatable disc including a first communication opening and a second communication opening formed therein;
a second rotatable disc coupled to the rotatable shaft adjacent the second end of the main body, the second rotatable disc including a third communication opening and a fourth communication opening formed therein,
wherein the first communication opening, an interior of the first end cap, and the second communication opening cooperate to provide fluid communication between a first pair of the flow chambers, wherein the third communication opening, an interior of the second end cap, and the fourth communication opening cooperate to provide fluid communication between a second pair of the flow chambers distinct from the first pair of the flow chambers, and wherein rotation of the rotatable shaft alters which of the flow chambers constitutes the first pair of the flow chambers and which of the flow chambers constitutes the second pair of the flow chambers.

2. The flow control valve of claim 1, further comprising a first fixed disc disposed between the main body and the first rotatable disc and a second fixed disc disposed between the main body and the second rotatable disc.

3. The flow control valve of claim 2, wherein a planar surface of the first rotatable disc is in contact with a planar surface of the first fixed disc and wherein a planar surface of the second rotatable disc is in contact with a planar surface of the second fixed disc.

4. The flow control valve of claim 3, wherein the planar surface of the first rotatable disc, the planar surface of the first fixed disc, the planar surface of the second rotatable disc, and the planar surface of the second fixed disc are all formed by a precision ground ceramic material.

5. The flow control valve of claim 2, wherein the first fixed disc includes a plurality of chamber openings formed therein and provides selective fluid communication between the interior of the first end cap and the first pair of the flow chambers, and wherein the second fixed disc includes a plurality of chamber openings formed therein and provides selective fluid communication between the interior of the second end cap and the second pair of the flow chambers.

6. The flow control valve of claim 2, wherein the first fixed disc includes a first shaft opening receiving the rotatable shaft and wherein the second fixed disc includes a second shaft opening receiving the rotatable shaft, wherein the rotatable shaft rotates relative to the first fixed disc and the second fixed disc.

7. The flow control valve of claim 1, wherein the first end cap includes a first fluid turn-around surface and the second end cap includes a second fluid turn-around surface.

8. The flow control valve of claim 7, wherein the first turn-around surface and the second turn-around surface each include a concave hemispherical shape.

9. The flow control valve of claim 1, wherein the four flow chambers include, in order around a circumferential direction of the shaft guide, a first flow chamber, a second flow chamber, a third flow chamber, and a fourth flow chamber.

10. The flow control valve of claim 9, wherein in a first mode of operation of the flow control valve the first pair of the flow chambers constitutes the first flow chamber and the fourth flow chamber while the second pair of the flow chambers constitutes the second flow chamber and the third flow chamber.

11. The flow control valve of claim 10, wherein in a second mode of operation of the flow control valve the first pair of the flow chambers constitutes the third flow chamber and the fourth flow chamber while the second pair of the flow chambers constitutes the first flow chamber and the second flow chamber.

12. The flow control valve of claim 11, wherein the flow control valve is adjusted from the first mode of operation to the second mode of operation by rotating the rotatable shaft 90 degrees.

13. The flow control valve of claim 1, wherein the flow control valve is adjustable between a first mode of operation and a second mode of operation, wherein the first mode of operation includes the first pair of the flow chambers cooperating to form a portion of a first fluid loop and the second pair of the flow chambers cooperating to form a portion of a second fluid loop independent from the first fluid loop, and wherein the second mode of operation includes the first pair of the flow chambers and the second pair of the flow chambers all cooperating to form a combined third fluid loop.

14. The flow control valve of claim 1, wherein each of the four flow chambers is in direct fluid communication with a fluid port, wherein each of the fluid ports provides direct fluid communication between one of the four flow chambers and a fluid conveying structure provided independently of the flow control valve.

15. The flow control valve of claim 1, wherein each of the four flow chambers is disposed in a different quadrant of the main body.

16. The flow control valve of claim 1, wherein the main body further includes a plurality of dividing walls extending radially outwardly from the guide shaft to an inner surface of an outer circumferential wall of the main body, wherein each of the dividing walls forms a boundary between adjacent ones of the flow chambers.

17. The flow control valve of claim 1, when an actuator selectively rotates the rotatable shaft to adjust the flow control valve between a first mode of operation and a second mode of operation.

18. The flow control valve of claim 1, wherein each of the first communication opening, the second communication opening, the third communication opening, and the fourth communication opening is passed by a fluid flowing in an axial direction of the main body.

19. The flow control valve of claim 18, wherein the fluid flows through the first communication opening in a direction opposite to a direction the fluid flows through the second communication opening, and wherein the fluid flows through the third communication opening in a direction opposite to a direction the fluid flows through the fourth communication opening.

20. A flow control valve comprising:
a main body extending axially from a first end to a second end, the main body defining a shaft guide and four flow chambers spaced circumferentially around the shaft guide, the four flow chambers including a first flow chamber, a second flow chamber, a third flow chamber, and a fourth flow chamber provided in that order with respect to a circumferential direction around the shaft guide;
a rotatable shaft received in the shaft guide of the main body;
a first end cap coupled to the first end of the main body;
a second end cap coupled to the second end of the main body;
a first rotatable disc coupled to the rotatable shaft adjacent the first end of the main body, the first rotatable disc including a first communication opening and a second communication opening formed therein;
a second rotatable disc coupled to the rotatable shaft adjacent the second end of the main body, the second rotatable disc including a third communication opening and a fourth communication opening formed therein,
wherein a first mode of operation of the flow control valve includes the first communication opening, an interior of the first end cap, and the second communication opening cooperating to provide fluid communication between the first flow chamber and the fourth flow chamber and the third communication opening, an interior of the second end cap, and the fourth communication opening cooperating to provide fluid communication between the second flow chamber and the third flow chamber, and wherein a second mode of operation of the flow control valve includes the first communication opening, the interior of the first end cap, and the second communication opening cooperating to provide fluid communication between the third flow chamber and the fourth flow chamber and the third communication opening, the interior of the second end cap, and the fourth communication opening cooperating to provide fluid communication between the first flow chamber and the second flow chamber.

\* \* \* \* \*